(12) United States Patent
Stevens et al.

(10) Patent No.: US 8,457,594 B2
(45) Date of Patent: Jun. 4, 2013

(54) PROTECTION AGAINST UNAUTHORIZED WIRELESS ACCESS POINTS

(75) Inventors: Gilman R. Stevens, Fairview, TX (US); Charles I. Cook, Louisville, CO (US)

(73) Assignee: Qwest Communications International Inc., Denver, CO (US)

(*) Notice: Subject to any disclaimer, the term of this patent is extended or adjusted under 35 U.S.C. 154(b) by 850 days.

(21) Appl. No.: 11/467,481

(22) Filed: Aug. 25, 2006

(65) Prior Publication Data

US 2008/0052512 A1 Feb. 28, 2008

(51) Int. Cl.
*H04M 1/66* (2006.01)

(52) U.S. Cl.
USPC .......... 455/410; 455/411; 370/338; 709/225; 726/4

(58) Field of Classification Search
USPC .................. 455/411, 410; 709/225; 726/1–4, 726/21; 370/338
See application file for complete search history.

(56) References Cited

U.S. PATENT DOCUMENTS

| | | | |
|---|---|---|---|
| 6,112,078 A * | 8/2000 | Sormunen et al. | 455/411 |
| 6,870,822 B2 * | 3/2005 | Balogh | 370/332 |
| 6,970,705 B2 * | 11/2005 | Yoshimoto et al. | 455/435.2 |
| 7,050,789 B2 * | 5/2006 | Kallio et al. | 455/411 |
| 7,068,999 B2 * | 6/2006 | Ballai | 455/411 |
| 7,075,912 B2 * | 7/2006 | Suda et al. | 370/331 |
| 7,103,359 B1 * | 9/2006 | Heinonen et al. | 455/436 |
| 7,133,526 B2 * | 11/2006 | Whelan et al. | 380/270 |
| 7,158,777 B2 * | 1/2007 | Lee et al. | 455/411 |
| 7,203,481 B2 * | 4/2007 | Nakao | 455/411 |
| 7,231,203 B2 * | 6/2007 | Marcelli | 455/411 |
| 7,283,820 B2 * | 10/2007 | Kamijo et al. | 455/435.1 |
| 7,342,906 B1 * | 3/2008 | Calhoun | 370/338 |
| 7,346,338 B1 * | 3/2008 | Calhoun et al. | 455/411 |
| 7,395,050 B2 * | 7/2008 | Tuomi et al. | 455/411 |
| 7,453,840 B1 * | 11/2008 | Dietrich et al. | 370/328 |
| 2002/0157090 A1 * | 10/2002 | Anton, Jr. | 717/178 |
| 2003/0048174 A1 * | 3/2003 | Stevens et al. | 340/5.64 |
| 2003/0186679 A1 * | 10/2003 | Challener et al. | 455/410 |
| 2004/0003285 A1 | 1/2004 | Whelan et al. | |
| 2004/0090930 A1 * | 5/2004 | Lee et al. | 370/328 |
| 2004/0249961 A1 * | 12/2004 | Katsube et al. | 709/229 |
| 2005/0114649 A1 | 5/2005 | Challener et al. | |
| 2005/0202800 A1 | 9/2005 | Wang | |
| 2006/0064588 A1 | 3/2006 | Tidwell et al. | |
| 2006/0209700 A1 | 9/2006 | Sundar et al. | |
| 2007/0077916 A1 * | 4/2007 | Saito | 455/411 |
| 2008/0059804 A1 * | 3/2008 | Shah et al. | 713/186 |
| 2008/0066157 A1 | 3/2008 | Stevens et al. | |
| 2008/0295159 A1 * | 11/2008 | Sentinelli | 726/6 |

OTHER PUBLICATIONS

Article from American Banker entitled "Wachovia Mulling ID Authentication Tools", by Daniel Wolfe.*

(Continued)

*Primary Examiner* — Steven Kelley

(74) *Attorney, Agent, or Firm* — Swanson & Bratschun, L.L.C.

(57) ABSTRACT

A public wireless network has authorized wireless access points through which users connect to the network. Authentication software provided to a user prompts a user to enter a password that is provided over a secure link to an authentication server. The authentication server provides the password to each authorized access point, so that it may be provided to the user when accessing the network through located wireless access point. If the password is not provided to the user by the located access point, the user is alerted that the located access point may be unauthorized.

21 Claims, 2 Drawing Sheets

OTHER PUBLICATIONS

U.S. Appl. No. 11/467,495, Office Action dated Oct. 13, 2009, 11 pages.
U.S. Appl. No. 11/467,495, Final Rejection dated May 4, 2010, 12 pages.
U.S. Appl. No. 11/467,495 Office Action dated Mar. 30, 2011, 16 pages.
U.S. Appl. No. 11/467,495; Advisory Action dated Nov. 28, 2011; 3 pages.
U.S. Appl. No. 11/467,495; Final Office Action dated Oct. 3, 2011; 12 pages.

* cited by examiner

PROTECTION AGAINST UNAUTHORIZED WIRELESS ACCESS POINTS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Public wireless networks have become a popular way for consumers to access the internet. Networks that operate in accordance with IEEE (Institute of Electrical and Electronics Engineers) standards 802.11a, 802.11b, 802.11g and 802.11n are often referred to as "WiFi", and are now frequently found in many locations accessible to the public, such as airports, coffee shops, and hotels. In some locations, public wireless networks may be used free of charge, and in other locations the user may be charged a fee by the operator in order to access the network.

Public networks are expected to expand even further with recent efforts to build and operate municipal or metropolitan networks that operate under similar IEEE standards. In such networks (sometimes referred to as "WiMax"), access points are located throughout a municipal, metropolitan or other large geographical area, so that consumers will have wireless access to the internet anywhere within that area.

Unfortunately, identity thieves and hackers have recognized the opportunity to use WiFi networks to steal personal information from users. For example, a thief will set up an unauthorized access point (sometimes referred to as an "evil twin") near the network, sometimes with a name or ID that appears to be related to the authorized network. The user connects to the unauthorized access point, and may see a screen that has been designed by the thief to look like the authorized access point. For example, screen may have a logo and other graphics that are similar to those found when accessing the authorized access point, such as the name of the coffee shop or hotel that operates the network or "hotspot." The thief may request personal information from the user, and also capture information sent by the user when using the unauthorized access point during an internet session.

BRIEF SUMMARY OF THE INVENTION

There is provided, in accordance with embodiments of the present invention, a network/system and method for detecting unauthorized access points (e.g., so-called "evil twins") operating near a public or private wireless network.

In one embodiment, a system for detecting unauthorized access points is associated with a public wireless network for connecting users to the internet. The system includes an authentication server and a secure link over which a user connects to the authentication server. The user is prompted to provide a user password to the authentication server over the secure link prior to connecting to the network through a located access point. The authentication server provides the password to each authorized wireless access point, so that if a located access point does not have the password, such access point may be identified as unauthorized.

A more complete understanding of the present invention may be derived by referring to the detailed description of the invention and to the claims, when considered in connection with the attached Figures.

DETAILED DESCRIPTION OF THE INVENTION

Figure 1:
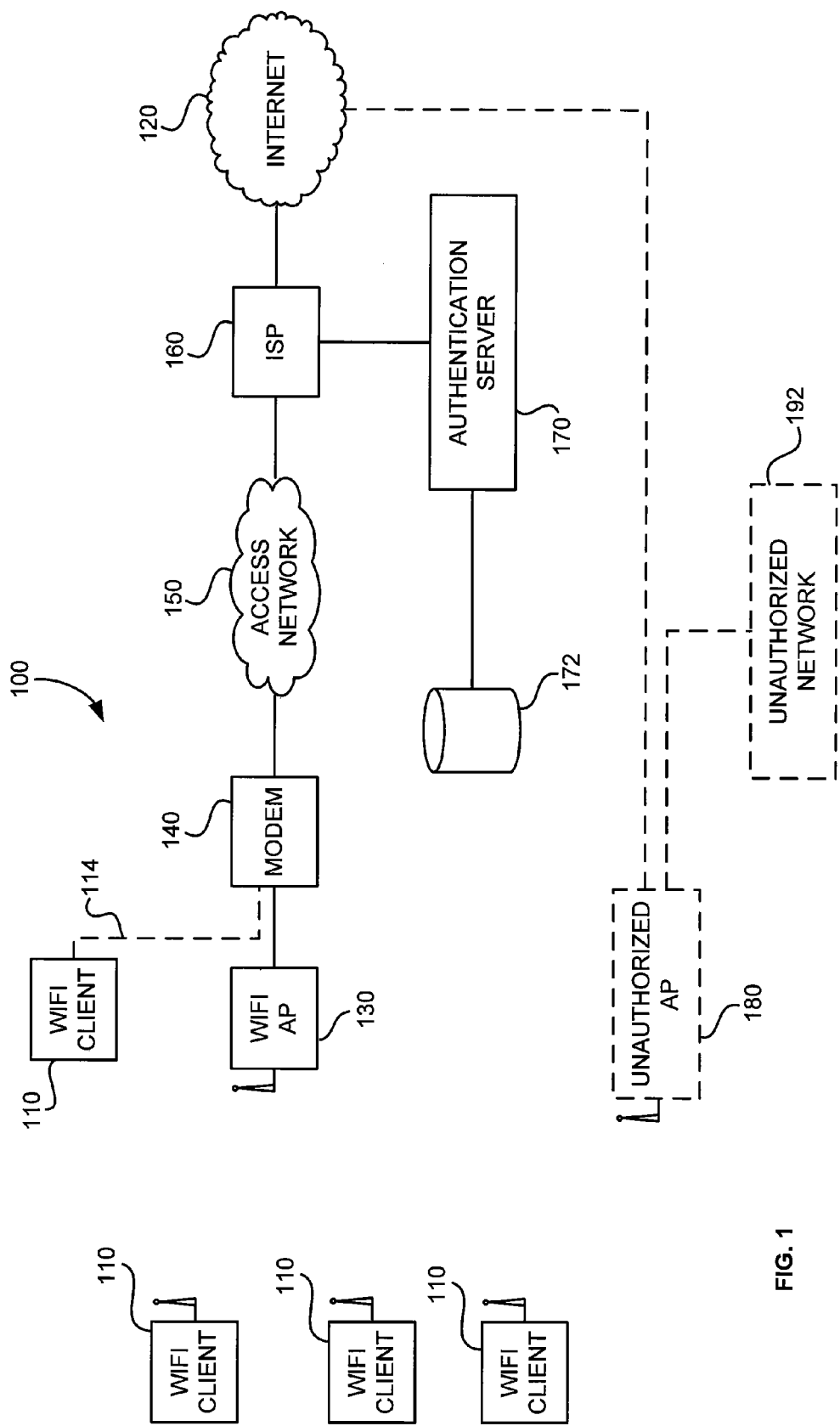
FIG. 1 illustrates a network operating in accordance with one embodiment of the invention.

There are various embodiments and configurations for implementing the present invention. One such implementation is shown in FIG. 1, where according to an embodiment of the invention a network 100 connects users or WiFi clients 110 to the internet 120. As an example, a user 110 may be a person with a laptop computer or similar device desiring to access the internet through the network 100. The network 100 includes an access point (WiFi AP) 130 establishing a "hotspot" through which each of the users 110 communicate in accordance with well known wireless standards and protocols (e.g., IEEE 802.11a/b/g/n). While only a single AP 130 is seen in FIG. 1, it should be appreciated that depending on the size of the area served or the number of users 110 that are to be connected, there could be multiple APs 130 at the hotspot providing wireless connections to users at the network 100.

AP 130 is connected through a modem 140 (such as a DSL modem, cable modem, etc.) to an access network 150, which may be a PSTN (public switched telephone network) employing DSL technology, a high speed cable network, or other broadband or high speed data network. The user is provided connectivity to the internet through an Internet Service Provider (ISP) 160. The ISP maintains servers for providing various applications (email, security, etc.), including an authentication server 170 (and its associated database or memory store 172), which authenticates approved users and provides features (to be described later) for identifying and handling unauthorized access points, such as an unauthorized AP 180.

As described earlier, a person setting up a unauthorized AP may do so for the purpose of "spoofing" or imitating an authorized AP (such as the WiFi AP 130) in order to steal data or obtain personal information from one of the users 110. Such a scheme may include setting up an access point in a nearby building or from a mobile location (e.g., automobile) within range of the area served by the AP 130. The unauthorized AP 180 may be set up to have the "look and feel" of an authorized access point. Among other things, it may be set up to have a name, MAC (media access control) address, or SSID (service set identifier) confusingly similar to the name, address or identifier of the network 100. It may be programmed with a portal or "splash" page that resembles the portal or page set up by the operator of the network 100.

As an example, if the network 100 is located at a coffee shop, a user that has a WiFi enabled laptop computer and that is visiting the coffee shop may see several APs visually displayed on the computer screen when the computer is turned on, and mistakenly pick one that has a name similar to the name of the coffee shop but that is in fact unauthorized AP 180. The user thus unwittingly selects unauthorized AP 180 and then sees an opening or "splash" page that bears the name or logo of the coffee shop (or something similar to that name or logo). Thereafter, any data being entered by the user is monitored by the unauthorized AP 180 (and the person operating that AP). The unauthorized AP may connect the user to the internet, so that the user goes to a trusted site (e.g., a banking site, or another site where personal data is entered), and while at the site has all of his or her data monitored by the unauthorized AP. The unauthorized AP may also connect to a private "unauthorized" network or system 192, which runs applications and displays screens soliciting personal information from the user 110.

In one embodiment, and as illustrated in FIG. 1, each user or WiFi client 110 is connected to network 100 via a secure link 114. The secure link 114 is made (by each user) prior to accessing the network via wireless AP 130 (for reasons to become apparent shortly). The secure link could be a hardwired connection to modem 140, although other secure links are possible (such as a secure wireless link), as long as the link 114 is assured of being secure and not one on which communications could be intercepted, such as by the operator of the unauthorized AP 180. As will be described in greater detail below in connection with FIG. 2, the purpose of secure link 114 is to permit a key or password to be entered by user 110, which password will later be used by network 100 to prevent unauthorized access point 180 (which will not have the password) to appear to users as the authorized AP 130.

Figure 2:
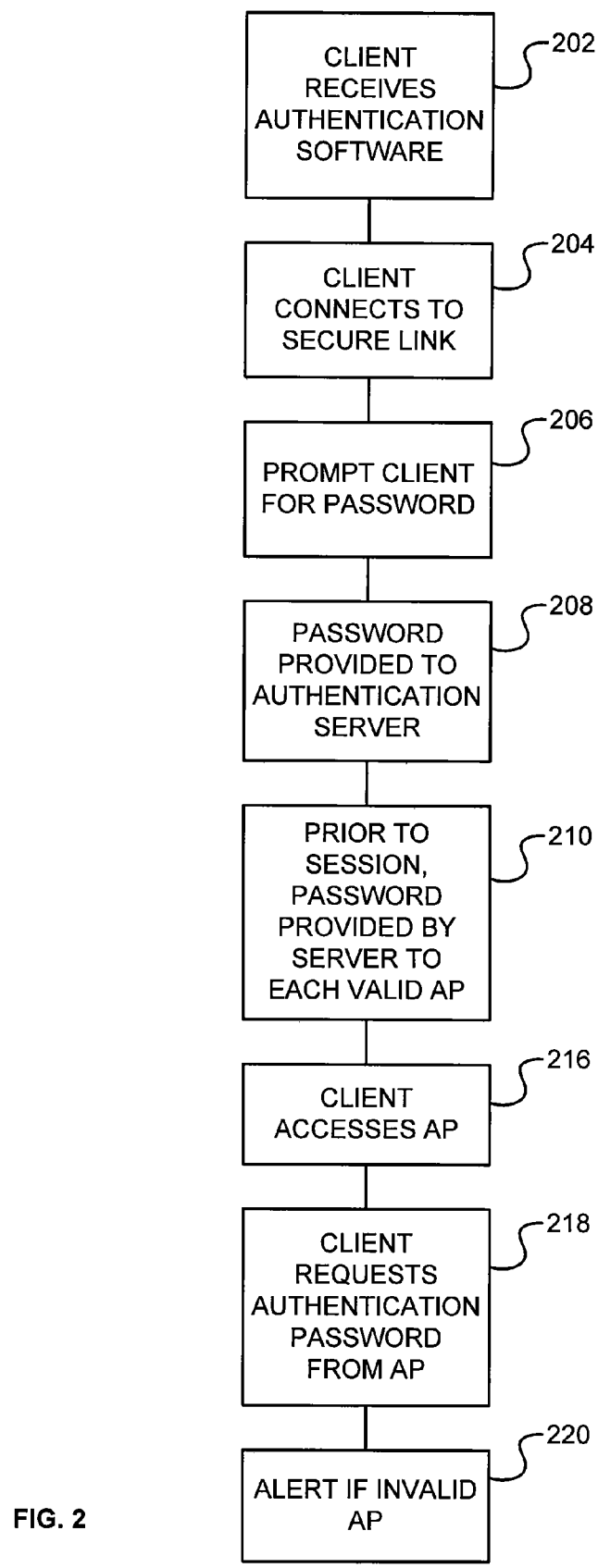
FIG. 2 is a flow diagram illustrating the operation of the network of FIG. 1, implementing a method for detecting unauthorized access points.

The operation of the system, and program steps for implementing one embodiment of the invention, are illustrated in FIG. 2.

The user or client 110 first receives authentication software (step 202), which is executed on the device (e.g., laptop) of the client or user 110, and which initiates the process for protecting against unauthorized access points. The software may be provided in advance to the user in the form of computer media such as a diskette when the user first makes arrangements for accessing the network 100. For example, a coffee shop that offers an internet hotspot may require any new user to first register, and provides the software as part of the registration. Alternatively, a user may be provided a hardwired or similar secure physical link to the network at the hotspot (e.g., a cabled connection at the AP 130 or modem 140) from which the authentication software may be downloaded. Of course, other methods of obtaining the software are possible.

Once the client has the authentication software, the client connects (step 204) to the secure link at the network 100 (assuming the client is not already connected in as part of step 202), and the client is prompted to enter a key or password or at step 206 (the password can be any string of characters selected by the user, although it should be appreciated that in some embodiments a pre-selected password may already be stored in the user device, or loaded into the user device as part of the authentication software). At this point, in the described embodiment, the client is now in communication with the authentication server 170, and this and subsequent steps are carried out by the authentication software at the user device in conjunction with programming in the authentication server 170.

The use of a secure link at step 204 (the link illustrated in FIG. 1 as link 114) is for purposes of the password being securely passed from the user 110 to the authentication server 170, and later being used to prevent the user from unwittingly accessing unauthorized AP 180 when attempting access to the network 100 through authorized AP 130. The user enters a password and that password is passed (step 208) through secure link 114, modem 140, access network 150 and ISP 160 to server 170, and stored in database 172. At step 210, the server 170 subsequently passes the password to AP 130 (and any other authorized access points in network 100), where it is stored and used to initiate any authorized session between AP 130 and the user 110.

When the user 110 attempts a wireless connection to AP 130, the authentication software in the user device queries the AP 130 for the password (step 218). The authorized AP 130 will provide the password to the client and thereafter a communication session between the user and the network 100 proceeds. On the other hand, if the access point located by the user is unable to provide the password (such as would happen if a connection has been made to the unauthorized AP 180), the authentication software at the user device alerts the user that the access point is not authorized or valid (step 220) and prevents further communications (or advises the users that further communications may put data at risk).

While not illustrated in FIG. 2, the authentication software at the user device can be used to automatically look for an authorized access point that has the proper password, and at that point automatically connect to the authorized AP 130. As an example, when the user turns on his/her user device in the area of the network 100, the authentication software may be programmed to locate and connect to each available AP, request the password from each such AP, and deny further communications with any AP not having the password (or only keep the connection with an authorized AP, such as the one with the strongest signal). Further, the authentication software can be programmed to provide an alert to the authentication server 170 if a prior attempt at connection has resulted in communication with unauthorized AP 180, so that the server 170 can issue an alert to the operator of the network that an "evil twin" or unauthorized AP is in the vicinity of the authorized access point 130.

Also, while not illustrated in FIG. 2, a technician could be dispatched to the area of the network to locate the detected unauthorized AP 180. Among other things, the technician may locate wireless signals emanating from the unauthorized AP 180 and use triangulation or similar methods to pinpoint the exact location and then take appropriate steps to disable AP 180.

While a detailed description of presently preferred embodiments of the invention has been given above, various alternatives, modifications, and equivalents will be apparent to those skilled in the art without varying from the spirit of the invention. As an example, the network 100 could be a metropolitan network (e.g., operated on behalf of a municipality) covering a relatively large geographical area, having numerous authorized access points 130, and operating in accordance with so-called WiMax or WiFi standards (e.g., IEEE Standard 802.16 or 802.11 respectively).

As another example, while the authentication server 170 is illustrated as a device separate from AP 130, the functions described herein relating to authentication of any AP could be implemented by programming within AP 130 without the need for server 170.

As yet another example, the password from the user for purposes of authenticating the AP 130 can be a word, numbers, PIN, key or any other string of characters (chosen by the user or generated by the system), and could be alpha-numeric or in other forms (e.g., user biometric measurements, or an image).

Therefore, the above description should not be taken as limiting the scope of the invention, which is defined by the appended claims.

What is claimed is:

1. In a wireless network where users connect to the wireless network through one or more wireless access points, a system for preventing connection with an unauthorized wireless access points, comprising:
   an authentication server configured to:
      receive, from a user device, a password established by the user over a secure link prior to the user attempting an unsecured connection to the wireless network through a wireless access point, the secure link being a hardwired link between the user device and an authorized wireless access point; and
      provide the user-established password to each authorized wireless access point; and
   a user device configured to:
      receive, over the secure link, an authentication program;
      locate a wireless access point;
      request the user-established password when the user connects to the located wireless access point with the user device, after connecting to the authentication server over the secure link;
      attempt to authenticate the located wireless access point with the user-established password;
      determine, when the located wireless access point does not have the user-established password, that the located wireless access point is unauthorized; and
      transmit an alert to the authentication server, based on the determination that the located wireless access point is unauthorized, the alert identifying the located wireless access point as unauthorized.

2. The system of claim 1, wherein the user communicates with wireless access points through a user device, and wherein
   the authentication program provides the password to the authentication server over the secure link and requests the password from the located wireless access point when initiating communications with the located wireless access point after connecting to the authentication server over the secure link.

3. The system of claim 2, wherein
   the authentication program provides an alert to the user device and the authentication server if the located wireless access point does not provide the requested password; and
   the authentication server is adapted to alert a network operator that the located wireless access point did not provide the requested password.

4. The system of claim 1, wherein the authentication server is maintained by an Internet Service Provider (ISP) and is separate from each authorized wireless access point.

5. The system of claim 1, wherein the authorized wireless access point comprises the authentication server.

6. The system of claim 1, wherein the wireless network has multiple authorized wireless access points.

7. The system of claim 1, wherein the wireless network is a public WiFi network.

8. The system of claim 6, wherein the wireless network connects a user to the internet.

9. The system of claim 2, wherein the authentication program is adapted to control the user device to automatically look for an authorized wireless access point that has received the password and connect to the authorized wireless access point.

10. The system of claim 9, wherein the authentication program controls the user device to automatically looks for the authorized wireless access point, request the password from the authorized wireless access point, connect to the authorized wireless access point, and deny further communications with any unauthorized wireless access point upon powering on the user device.

11. A method for detecting unauthorized wireless access points in a wireless network serving wireless users within a predetermined geographical area, comprising:
   establishing a connection to an authentication server over a secure link prior to the user attempting to access the wireless network with a user device through a wireless access point, wherein the secure link is a hardwired link between the user device and an authorized wireless access point;
   receiving, with the authentication server over the secure link, a password established by the user;
   providing the user-established password from the authentication server to each of one or more authorized wireless access points;
   receiving, at the user device, an authentication program over the secure link;
   requesting, with the user device, the password from a located wireless access point when the user initiates access at the located wireless access point after connecting to the authentication server over the secure link;
   authenticating, with the user device, the located wireless access point with the user-established password;
   when the located wireless access point does not have the user-established password, determining, with the user device, that the located wireless access point is not an authorized wireless access point and transmitting, with the user device, an alert identifying the located wireless access point as an unauthorized wireless access point; and
   receiving, at the authentication server, the alert from the user device identifying the located wireless access point as an unauthorized wireless access point.

12. The method of claim 11, further comprising: alerting the user and the authentication server if the located wireless access point is identified as an unauthorized wireless access point; and alerting a network operator that the located wireless access point did not provide the requested password.

13. The method of claim 11, further comprising: alerting the authentication server of the unauthorized wireless access point when the user is thereafter connected to the wireless network through an authorized wireless access point.

14. The method of claim 11, further comprising: providing the authentication program to the user device in advance of the user attempting access to the wireless network through an authorized, wireless access point, the authentication program being used to prompt the user for entry of the password.

15. The method of claim 11, wherein the authentication server is maintained by an Internet Service Provider (ISP) and is separate from any authorized wireless access point.

16. The method of claim 11, wherein the authorized wireless access point comprises the authentication server.

17. The method of claim 11, wherein the wireless network has multiple authorized wireless access points.

18. The method of claim 11, wherein the wireless network is a public WiFi network.

19. The method of claim 18, wherein the wireless network connects a user to the internet.

20. The method of claim 14, wherein the authentication program is further used to control the user device to automatically look for an authorized wireless access point that has received the password and connect to the authorized wireless access point.

21. The method of claim 20, wherein the authentication program is provided to the user device and controls the user device to automatically look for an authorized wireless access point, request the password from the authorized wireless access point, connect to the authorized wireless access point, and deny further communications with any unauthorized wireless access point upon powering on the user device.

\* \* \* \* \*